United States Patent [19]

Nishiki et al.

[11] Patent Number: 4,689,487
[45] Date of Patent: Aug. 25, 1987

[54] RADIOGRAPHIC IMAGE DETECTION APPARATUS

[75] Inventors: Masayuki Nishiki, Ootawara; Kazuhiro Iinuma, Tochigi, both of Japan

[73] Assignee: Kabushiki Kaisha Toshiba, Kawasaki, Japan

[21] Appl. No.: 771,033

[22] Filed: Aug. 30, 1985

[30] Foreign Application Priority Data

Sep. 3, 1984 [JP] Japan ................................ 59-184107
Apr. 22, 1985 [JP] Japan ................................ 50-84414
Apr. 22, 1985 [JP] Japan ................................ 60-84416

[51] Int. Cl.[4] .......................................... G01T 1/20
[52] U.S. Cl. ................................. 250/361 R; 250/370
[58] Field of Search .............. 250/361 R, 370, 6, 6 X, 250/6 H, 6 I, 363 ST, 368, 369, 578; 358/212, 213, 111; 378/99, 19

[56] References Cited

U.S. PATENT DOCUMENTS

| 3,660,667 | 5/1972 | Weimer | 250/578 |
| 3,979,621 | 9/1976 | Yates | 250/213 |
| 3,994,584 | 11/1976 | Pryor | 356/354 |
| 4,164,657 | 8/1979 | Duinker et al. | 378/19 |
| 4,383,327 | 5/1983 | Kruger | 378/99 |
| 4,442,539 | 4/1984 | Aichinger et al. | 378/99 |
| 4,471,378 | 9/1984 | Ng | 358/111 |

FOREIGN PATENT DOCUMENTS

| 0083477 | 5/1983 | Japan | 358/213 |
| 0010068 | 1/1984 | Japan | 358/213 |
| WO82/01962 | 6/1982 | PCT Int'l Appl. | 250/370 G |

OTHER PUBLICATIONS

"The Autofluoroscope" by Bender et al. *Nucleonics*, vol. 21, No. 10, Oct. 1963.
"Self-Scanned Image Sensors . . . by the Bucket-Brigade Method" by Weimer et al. *IEEE Transactions on Electron Devices*, vol. Ed 18, No. 11 (Nov. 1971).

*Primary Examiner*—Craig E. Church
*Assistant Examiner*—John C. Freeman
*Attorney, Agent, or Firm*—Finnegan, Henderson, Farabow, Garrett & Dunner

[57] ABSTRACT

An X-ray image transmitted through a patient is radiated on a phosphor member having a wide field of view and dimensions of about 40 cm×40 cm, and is converted into an optical image. The optical image is radiated on a light detector through a light guide member at substantially the same magnification. The light detector has pixels arranged in a 2,000×2,000 two-dimensional matrix form. Each pixel has a photocell and a MOSFET connected to each photocell. The photocell is electrically equivalent to a parallel circuit consisting of a photosensitive portion and an electrode capacitor. An extra capacitor is parallel-connected to the parallel circuit and a switch can turn on/off a connection between the extra capacitor and the photocell. When the optical image is radiated on the photocells, each photocell generates charges corresponding to the light amount, and the light amount is recorded in the electrode capacitor or the electrode capacitor and the extra capacitor, as a charged electrical amount. When this electrical amount is read out by shift registers, the optical image can be read out as a time-serial electrical signal. In a fluoroscopy mode with a small dose, the extra capacitor is not used. However, in a radiography mode with a large dose, the extra capacitor is used so as to increase a capacitance of the capacitors connected to the photocell. Thus, X-ray detection in X-ray fluoroscopy and radiography modes can be performed with a wide field of view.

18 Claims, 10 Drawing Figures

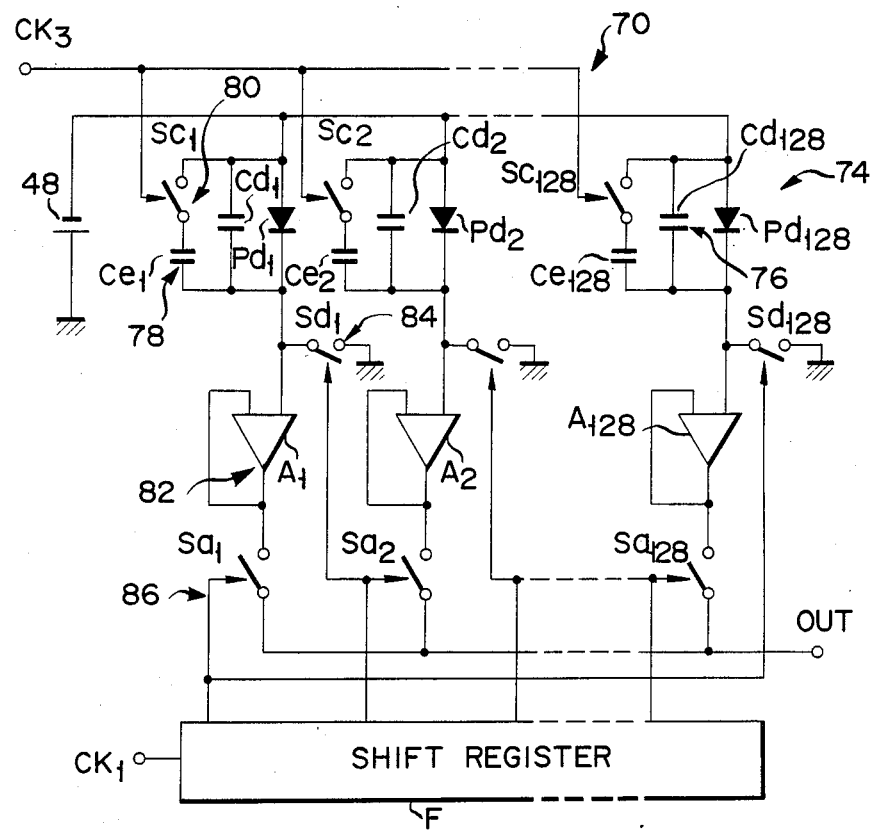
F I G. 7

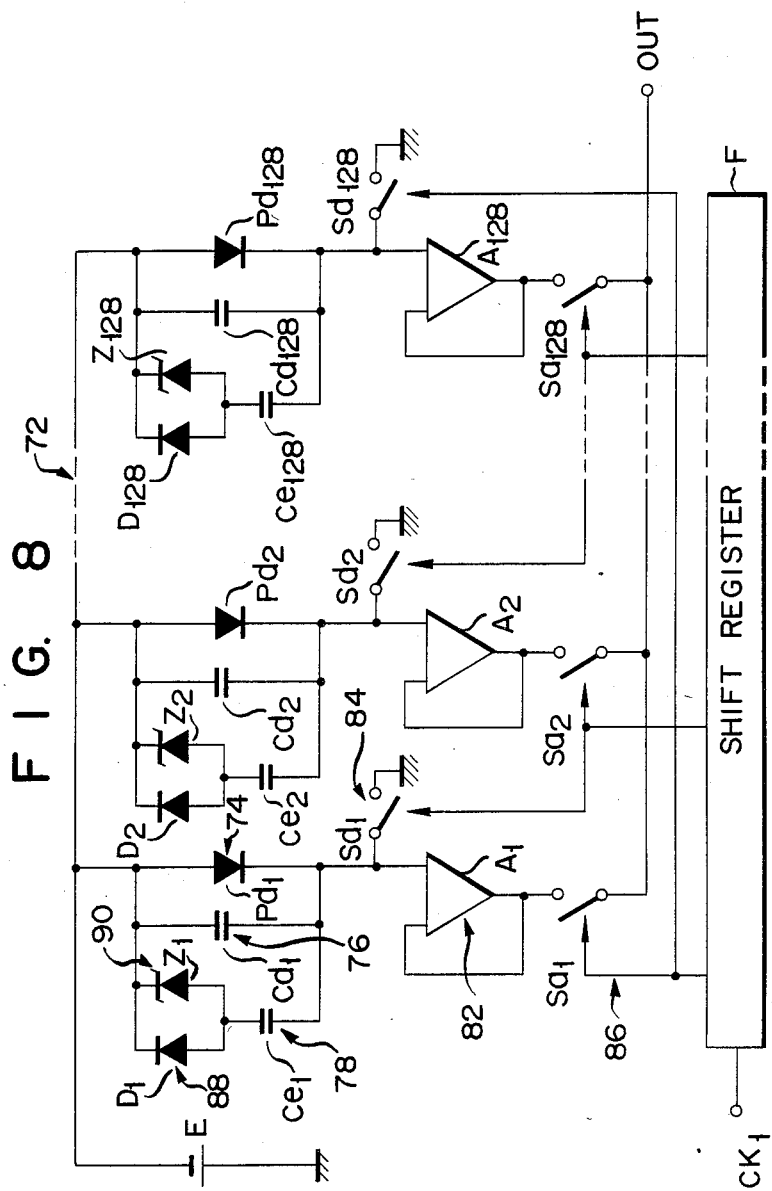

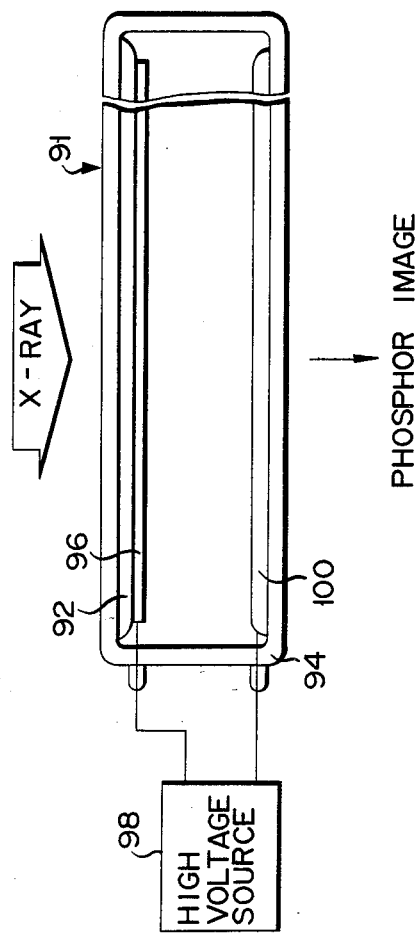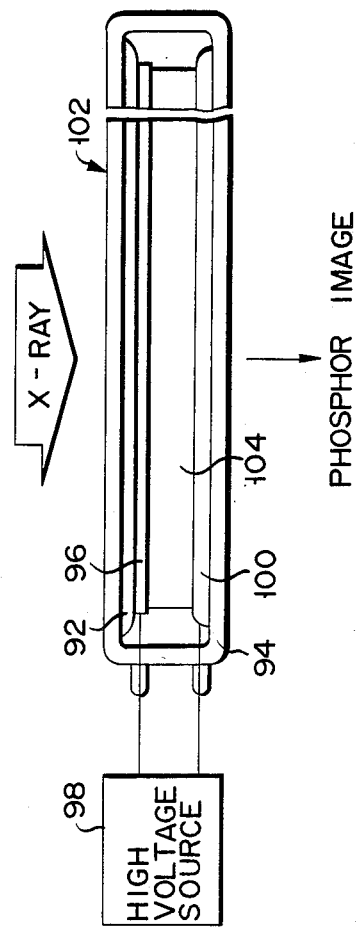

RADIOGRAPHIC IMAGE DETECTION APPARATUS

BACKGROUND OF THE INVENTION

The present invention relates to a radiographic image detection apparatus for exposing a patient to radiation so as to detect a radiographic image therefrom in radiation diagnosis.

FIG. 1 shows a conventional X-ray image detection apparatus which detects an X-ray image using an image intensifier (to be referred to as an I.I. for brevity) and an imaging tube. An X-ray tube 4 exposes a patient 2 to X-rays in response to an operation signal from an X-ray controller 12. The X-rays transmitted through the patient are radiated on an I.I. 6 which detects a transmission X-ray image. The I.I. 6 converts the X-ray image into an optical image and supplies the optical image to an imaging tube 10 such as a vidicon through an optical system 8. The imaging tube 10 converts the optical image into an analog video signal (time serial electrical signal), and the analog signal is converted into a digital signal by an A/D converter 18. Thereafter, the digital signal is supplied to an image memory 16. The memory 16 temporarily stores the digital video signal, and every time a predetermined amount of data is stored therein, supplies the storage data to an image processing unit 14. The unit 14 performs digital image processing such as digital subtraction. The digital signal generated from the unit 14 is converted into an analog signal by a D/A converter 20, and is then supplied to a TV monitor 22 to be displayed thereon.

However, the conventional X-ray detection apparatus using the I.I. and the imaging tube has the following drawbacks.

First, since the I.I. comprises a vacuum tube incorporating an electron lens, it is difficult to widen a detection field of view due to its structure. For example, in general, a maximum detection field of view of the I.I. is 12 inches (30 cm), and the shape thereof is limited to a circular shape.

Second, since the I.I. comprises a vacuum tube having a convex or concave surface, a pincushion distortion occurs in an output image. Even if an object having a uniform absorbency is imaged, the density distribution of an output image is not even, and so-called shading occurs at a peripheral portion of the image.

Third, since the imaging tube has a narrow dynamic range, it cannot be used both for fluoroscopy and radiography. In addition, due to its narrow dynamic range, the imaging tube has a low S/N ratio.

SUMMARY OF THE INVENTION

It is an object of the present invention to provide a compact, light-weight radiographic image detection apparatus having a wide dynamic range and a wide field of view, in which an output image is not distorted.

According to the present invention, there is provided a radiographic image detection apparatus which detects a two-dimensional image of radiation transmitted through a patient, comprising:

radiation/light converting means for converting the radiation into light and for generating an optical image when a radiographic image is radiated thereon;

light detecting means, comprising a semiconductor, for converting light into an electrical signal, in which the optical image having substantially the same magnification is radiated thereon, and the optical image is read as a two-dimensional image data signal; and image processing means for displaying an image in accordance with the image data signal generated from the light detecting means.

Furthermore the radiographic image detection apparatus includes capacitance means which can be selectively connected in parallel with the semiconductor to vary the capacitance of the semiconductor responsive to the intensity of the radiation.

According to the present invention, the apparatus can obtain a wide field of view, and becomes compact in size and light in weight as compared to a conventional apparatus using an I.I. and an imaging tube. According to the present invention, image distortion can be prevented, and the dynamic range can be widened from 60 dB (conventional apparatus) to 80 dB. Furthermore, when a photocell is used as the light detecting means, a capacitor is provided in parallel with the photocell, and a switch connects and disconnects the capacitor to the photocell, X-ray image detection can be performed both in an X-ray fluoroscopy mode and an X-ray radiography mode with a dose 100 times that of the X-ray fluoroscopy mode. When a light amplifier of a variable gain type is disposed between the radiation/light converting means and the light detecting means, X-ray detection can be performed both in the X-ray fluoroscopy and radiography modes.

BRIEF DESCRIPTION OF THE DRAWINGS

FIG. 7 is a circuit diagram of a light detector of an apparatus according to a second embodiment of the present invention;

FIG. 8 is a circuit diagram showing a modification of the light detector of FIG. 7;

FIG. 9 is a view showing a light amplifier of an apparatus according to a third embodiment of the present invention; and FIG. 10 is a view showing a modification of the light amplifier shown in FIG. 9.

DETAILED DESCRIPTION OF THE PREFERRED EMBODIMENTS

Figure 1:
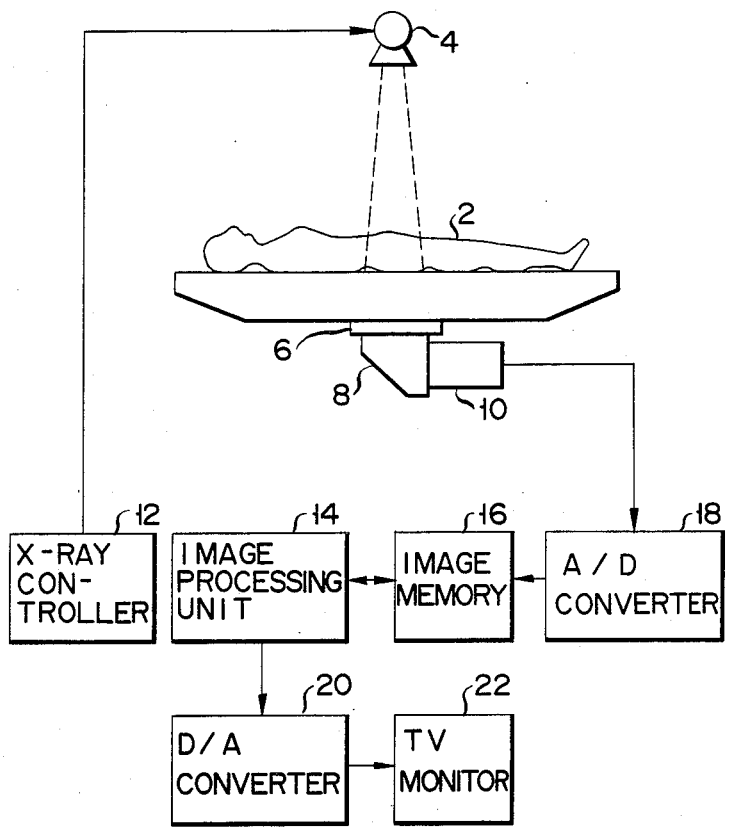
FIG. 1 is a block diagram showing a conventional X-ray image detection apparatus.
Figure 2:
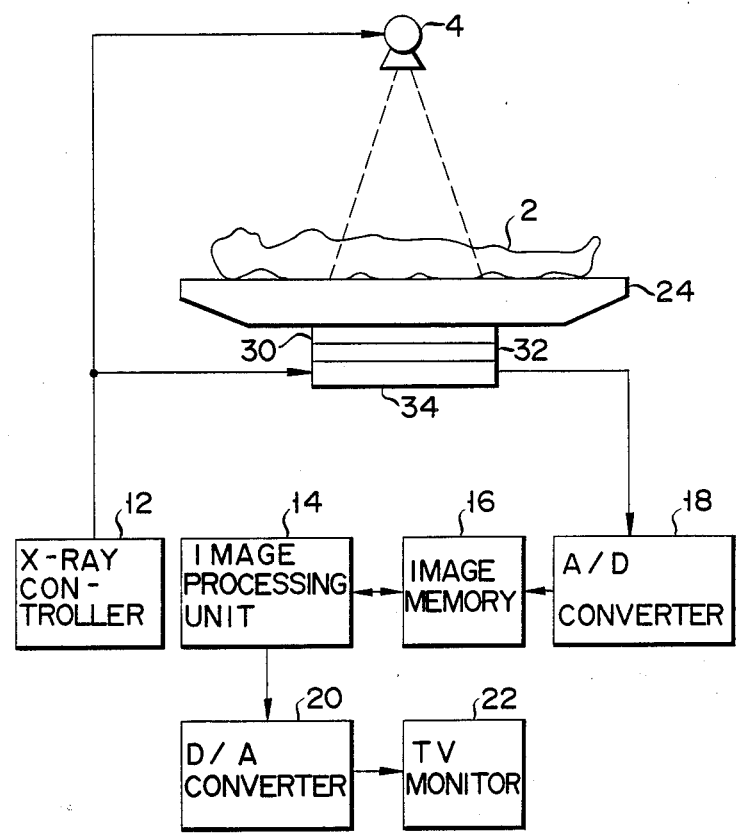
FIG. 2 is a block diagram showing an apparatus according to a first embodiment of the present invention.

FIG. 2 shows an X-ray image detection apparatus according to an embodiment of the present invention. The same reference numerals in FIG. 2 denote the same parts as in FIG. 1. An X-ray tube 4 exposes a patient 2 to X-rays in response to an operation signal from an X-ray controller 12. A bed 24 made of a material which can transmit X-rays is placed under the X-ray tube 4. A rectangular phosphor member 30 having a wide field of view and a size of 40 cm×40 cm is arranged on the lower side of the bed 24. A light guide member 32 is provided below the member 30 in contact therewith, and a semiconductor light detector 34 is provided below the member 32 in contact therewith. An X-ray image, radiated on the member 30 within almost all the field of view, is inputted in the light detector 34 through the member 32, and is converted into an electrical signal. The light detector 34 generates a detection signal of light corresponding to a dose of transmission X-rays with reference to respective detection positions of the two-dimensional field of view in a time serial manner. The light detection signal is converted into a digital signal by an A/D converter 18, and is then inputted in an image memory 16. The memory 16 temporarily stores the digital video signal, and every time a predetermined amount of data is stored therein, supplies the storage data to an image processing unit 14. The data is subjected to digital image processing such as digital subtraction by the unit 14. The output from the unit 14 is converted into an analog signal by a D/A converter 20, and is supplied to a TV monitor 22 so as to be displayed thereon.

The member 30 can be obtained in such a manner that a so-called sensitized or monocrystalline scintillator (e.g., CsI:Tl) obtained by adhering a phosphor powder using an adhesive as a binder is arranged in a columnar shape.

A thin plate-like fiber bundle can be used as the member 32, and the bundle of optical fiber is sliced along a direction perpendicular to a longitudinal direction thereof. A rod lens array in which Selfoc lenses are bundled can be used as the member 32. Note that the member 30 can be in direct contact with the detector 34 without the member 32 interposed therebetween. However, when the member 30 and the detector 34 are deposited on the member 32 as a base, a change in sensitivity distribution due to a change in environment can be prevented, thereby improving stability with respect to a change in temperature. It is undesirable that these members be adhered with each other. This is because when temperature is changed, light transmittance is changed in adhesive layers due to differences in thermal expansion coefficients of these members, resulting in poor detection precision.

Figure 3:
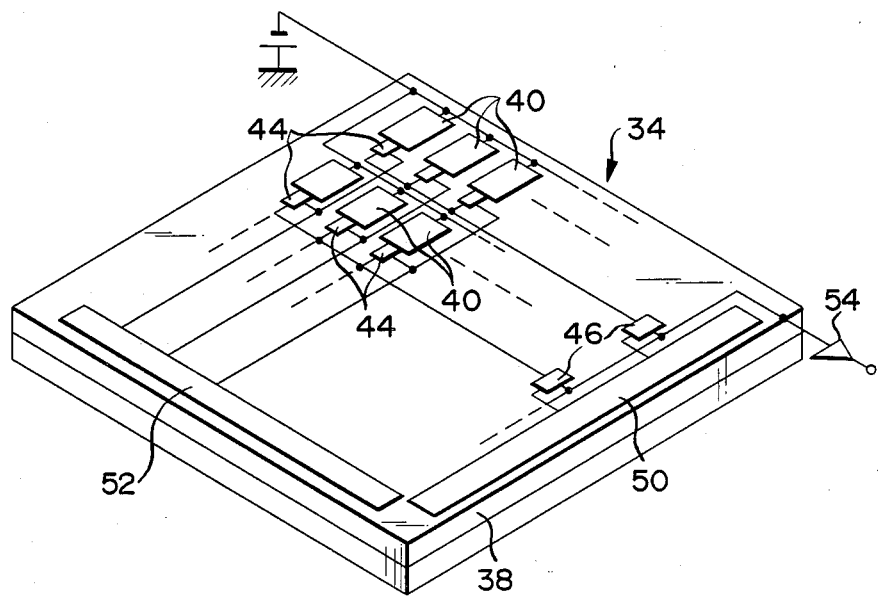
FIG. 3 is a schematic perspective view of a light detector of the apparatus shown in FIG. 2.
Figure 4:
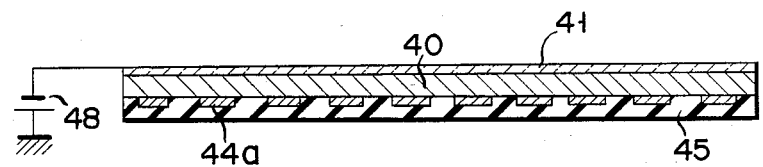
FIG. 4 is a sectional view of the light detector.
Figure 5:
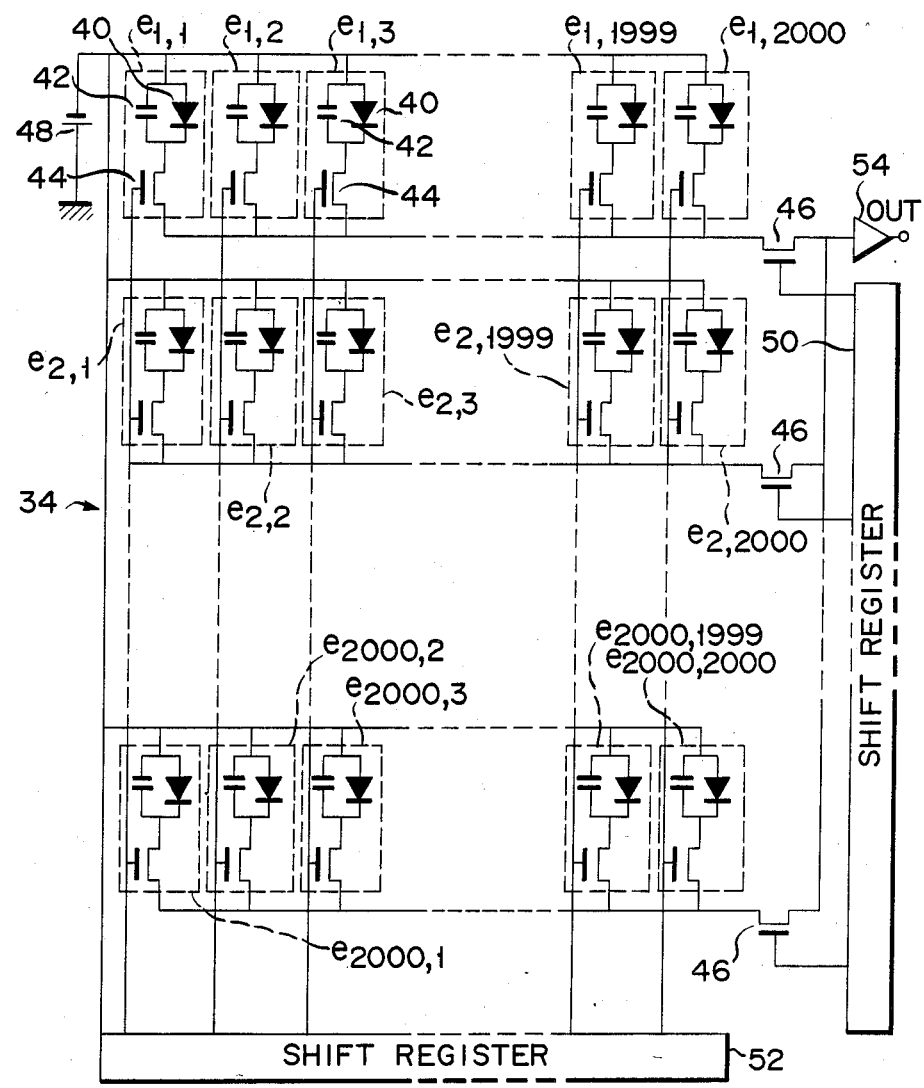
FIG. 5 is a circuit diagram of the light detector.

The light detector 34 will be explained in more detail. FIG. 3 is a schematic perspective view of the light detector 34 and FIG. 4 is a schematic sectional view thereof. FIG. 5 is a circuit diagram of the detector 34. The detector 34 has a field of view of 40 cm×40 cm, and an insulating base 38 has a rectangular shape larger than, for example, 40 cm×40 cm. On the base 38, a total of 4,000,000 0.2 mm×0.2 mm pixels $e_{1,1}, e_{1,2}, e_{1,3}, \ldots, e_{1,1999}, e_{1,2000}, e_{2,1}, e_{2,2}, e_{2,3}, \ldots, e_{2,1999}, e_{2,2000}, \ldots, e_{2000,1}, e_{2000,2}, e_{2000,3}, \ldots, e_{2000,1999},$ and $e_{2000,2000}$ are two-dimensionally arranged in 2,000 rows×2,000 columns. A photocell 40 and a MOS switch 44 are disposed in each pixel e. Referring to FIG. 3, although the photocell 40 and the switch 44 are shown to be arranged on an identical plane, the photocell 40 and the MOS switch 44 are stacked in practice using a TFT (thin film transistor) 44a and the like in order to maximize a light receiving region area of the photocell, as shown in FIG. 4. Thus, since the distance between two adjacent cells can be shortened and the light receiving region area can be widened, photosensitivity can be improved.

Each photocell is formed by using a semiconductor. As in this embodiment, when the field of view is large, e.g., 40 cm×40 cm, it is difficult to form such a photocell using a monocrystalline material. For this reason, a polycrystalline or amorphous material is used for forming the photocell. For example, amorphous silicon can be used as the photocell material. When a semiconductor is used as the photocell, a capacitor is formed between its electrodes. Therefore, the detector is configurated so that a capacitor 42 is connected in parallel with each photocell 40, as shown in FIG. 5.

In each of the pixels $e_{1,1}, e_{1,2}, e_{1,3}, \ldots, e_{1,1999},$ and $e_{1,2000}$ in the first row, a bias power source 48, the parallel circuit of the photocell 40 and the capacitor 42, and the source of the MOS switch 44 are serially connected. The drain of each MOS switch 44 is connected to the source of MOS switch 46. The gates of the 2,000 switches 44 are connected to corresponding channels of a column shift register 52.

The drain of the switch 46 is connected to an output terminal through an amplifier 54. The gate of the switch 46 is connected to the first channel of a row shift register 50.

In each of the pixels $e_{2,1}, e_{2,2}, e_{2,3}, \ldots, e_{2,1999},$ and $e_{2,2000}$ in the second row, the gates of the 2,000 MOS switches 44 are connected to corresponding channels of the register 52, and the drains thereof are connected to the second channel of the register 50. The pixels in other rows have the same arrangement as described above.

The operation of the X-ray image detection apparatus with the above arrangement will be described hereinafter. When X-rays are emitted from the X-ray tube 4, the X-rays are transmitted through the patient 2 and are radiated on the member 30. The member 30 converts the X-ray image into an optical image which is guided to the detector 34 at the same magnification by the member 32. In each pixel e, the bias is applied to the capacitor 42 when the MOS switch 44 is closed. The capacitor 42 is charged to its inter-terminal voltage. (That is, the MOS switch 44 is held at the ground potential.) Then, the MOS switch 44 is opened. Thereafter, when light is applied to the photocell 40, in the amount corresponding to the X-ray dose, carriers, the number of which corresponds to this amount of light, moves into the capacitor 42. Part of the charge accumulated in the capacitor 42 is thus discharged. Therefore, after the application of light, the capacitor 42 stores the electric charge which is the difference between its interterminal voltage and the voltage corresponding to the amount of the applied light. Therefore, its side on the MOS switch 44 is now held at a potential lower than the ground potential of the MOS switch 44. Therefore, after light radiation, charges decreased by the amount corresponding to the light amount are stored in the capacitor 42. The registers 50 and 52 sequentially close the switches 44 and 46, whereby the electrical charge supplied from the external electric source through the amplifier 54 is stored in the capacitor 42. Then, this electric charge, i.e., the output signal of each pixel, is detected by a detecting device (not shown).

In other words, in the detector 34, the register 50 enables the switches 46 connected to the pixels $e_{1,1}, \ldots, e_{1,2000}$ in the first row so as to connect these pixels to the amplifier 54. Then, the register 52 scans each pixel (photocell 40) in the first row and sequentially supplies electrical charges from the outer electrical source through the amplifier 54 to the pixels $e_{1,1}, \ldots, e_{1,2000}$. These electrical charges are amplified by the amplifier 54 and generated as time serial signals. The register 50 is switched to the second channel, and connects the pixels in the second row to the amplifier 54. Then, the register 52 scans the photocells in the second row and sequentially supplies the electrical charges through the amplifier 54. The switching operation by the registers 50 and 52 is repeated, thereby reading out signals from all the pixels.

These electrical signals are amplified by the amplifier 54, and are then converted into digital signals by the A/D converter 18. Thereafter, the digital signals are supplied to the memory 16 in a time serial manner so as to be stored therein.

Figure 6:
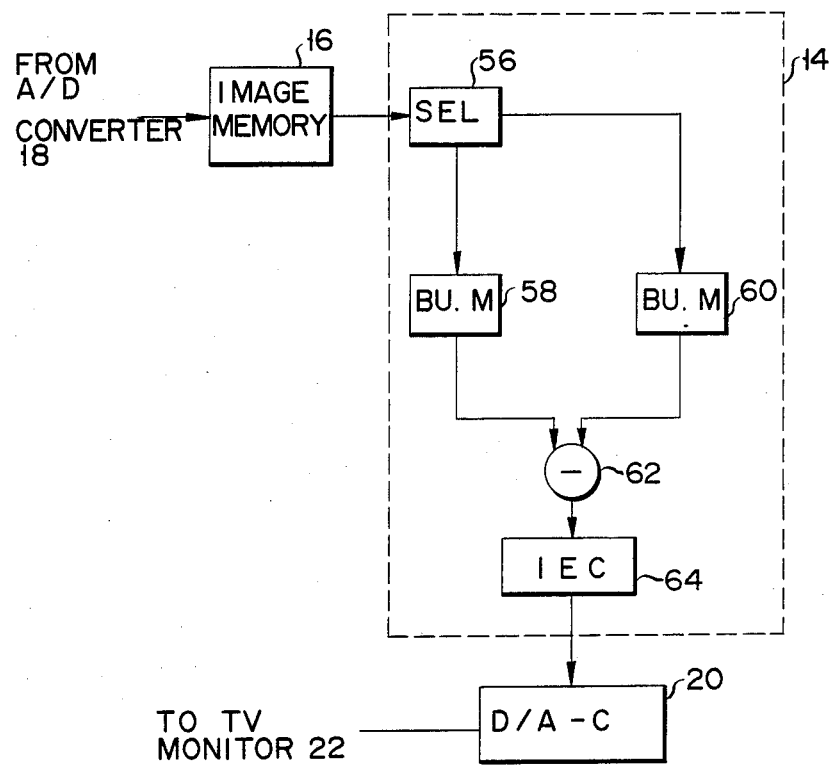
FIG. 6 is a block diagram of an image processing unit.

When the memory 16 stores a predetermined amount of data, it supplies the storage data to the unit 14, and the unit 14 performs processing such as filtering, averaging and digital subtraction. FIG. 6 is an example of a block diagram of the unit 14. The data from the memory 16 is separated into mask image data and contrast image data by a selector 56. The mask image data is stored in a buffer memory 58 and the contrast image data is stored in a buffer memory 60. These data are subjected to subtraction by a subtractor 62 so as to form a contrast image. The resultant data is subjected to processing such as space filtering by an image enhancement circuit 64. Then, the image data is supplied to the D/A converter 20. These operations are synchronized by a system controller (not shown).

The image data converted into an analog signal by the converter 20 is supplied to the TV monitor 22 and is displayed on the screen.

According to the apparatus with the above arrangement, since an image having the same magnification as that of an X-ray image transmitted through the patient is radiated on the light detector, a wide field of view can be obtained as compared to the conventional apparatus using the I.I. and the imaging tube, and the structure becomes compact in size. Since no vacuum tube is used, image distortion cannot occur, and a wide dynamic range can be obtained.

A second embodiment of the present invention will be described hereinafter. Two X-ray image detection modes are provided, i.e., a fluoroscopy mode in which the patient is irradiated with a small dose of X-rays so as to observe the X-ray image as motion pictures, and a radiography mode in which the patient is irradiated with a large dose of X-rays so as to form an image on an X-ray film. That is, the dose of X-rays is small in the fluoroscopy mode and is large in the imaging mode. For this reason, the amount of light radiated on the light detector differs in these modes. In the second embodiment, X-ray image detection in both modes can be performed.

FIG. 7 shows a part of a circuit diagram of a light detector 70 according to the second embodiment. The apparatus of the second embodiment is substantially the same as that of the first embodiment excluding the light detector. Referring to FIG. 7, for the sake of simplicity, pixels are arranged in a onedimensional manner, and have 128 channels. Needless to say, in the same manner as in the first embodiment, the pixels can be two-dimensionally arranged and have 2,000×2,000 channels.

The anodes of photocells 74 ($Pd_1$ to $Pd_{128}$) are connected to the negative terminal of a power source 48. Capacitors 76 ($Cd_1$ to $Cd_{128}$) are parallel-connected to the photocells $Pd_1$ to $Pd_{128}$. Furthermore, extra capacitors 78 ($Ce_1$ to $Ce_{128}$) having a capacitance larger than that of the capacitors $Cd_1$ to $Cd_{128}$ are parallel-connected to the capacitors $Cd_1$ to $Cd_{128}$ through switches 80 ($Sc_1$ to $Sc_{128}$). The switches $Sc_1$ to $Sc_{128}$ series-connected to the capacitors $Ce_1$ to $Ce_{128}$ are opened/closed in response to a control signal $CK_3$ supplied from a controller 12. In the fluoroscopy mode with a small dose, the switches $Sc_1$ to $Sc_{128}$ are opened. In the imaging mode with a large dose, the switches $Sc_1$ to $Sc_{128}$ are closed so as to increase the capacitance of the capacitors parallel-connected to the photocells $Pd_1$ to $Pd_{128}$. In this manner, when the capacitors $Ce_1$ to $Ce_{128}$ are connected, the capacitance is increased. Therefore, if the X-ray dose is large, charges on the capacitors are not saturated. On the other hand, if the X-ray dose is small, when the switches $Sc_1$ to $Sc_{128}$ are opened, the S/N ratio cannot be degraded. A capacitance $Cd$ of the capacitors $Cd_1$ to $Cd_{128}$ is suitable for the X-rays in the fluoroscopy mode. Assuming that the capacitance of the capacitors suited for the X-rays in the imaging mode is given by $C_0$, a capacitance $C_e$ of the capacitors $Ce_1$ to $Ce_{128}$ can be expressed by the following relation as an effective capacitance including the starting capacitance of the switches:

$$C_e = C_0 - C_d$$

The cathodes of the photocells $Pd_1$ are connected to inputs of preamplifiers $A_1$ to $A_{128}$, and are connected to switches $Sd_1$ to $Sd_{128}$ at the photocell side. When the switches $Sd_1$ to $Sd_{128}$ are closed, charges from the power source 48 are charged on the capacitors. The preampifiers $A_1$ to $A_{128}$ receive potentials from the cathodes of the photocells $Pd_1$ to $Pd_{128}$ at a high impedance, and generate them at a low impedance after amplifying them. The outputs from the preamplifiers $A_1$ to $A_{128}$ are connected to switches 86 ($Sa_1$ to $Sa_{128}$) at the output side. A shift register F controls the open/close operation of the switches $Sd_1$ to $Sd_{128}$ and $Sa_1$ to $Sa_{128}$ in response to a control signal $CK_1$ from the controller 12. Under the control of the shift register F, a signal corresponding to accumulated charges is generated onto a common signal line in a time serial manner.

The operation of the second embodiment will be described hereinafter. In the fluoroscopy mode, the switches $Sc_1$ to $Sc_{128}$ are kept open. The capacitors $Cd_1$ to $Cd_{128}$ receive charges from the power source 48, and are charged to a terminal voltage. The X-ray tube 4 emits continous X-rays having a tube current of several mA to a patient. The X-rays attenuated by the patient and transmitted therethrough are converted into light by a phosphor member 30. The converted light is radiated on the photocells $Pd_1$ to $Pd_{128}$ so as to generate charges corresponding to the light intensity. The charges flow into the capacitors $Cd_1$ to $Cd_{128}$, and erase the accumulated charges thereon. In other words, charges are decreased in proportion to the incident X-ray intensity. In the fluoroscopy mode, the switches $Sa_1$ to $Sa_{128}$ are synchronously and sequentially closed by the shift register F. When the switch $Sa_1$ is closed, a current corresponding to the charges erased by the X-rays is supplied from the power source 48 to the capacitor $Cd_1$. The current is detected by an output terminal OUT, and is supplied to an A/D converter 7. While the switch $Sa_1$ is closed, the capacitor $Cd_1$ is charged to an initial state. Then, the switch $Sa_2$ is closed, and the dose of the X-rays radiated on the photocell $Pd_2$ is detected. In this manner, while the X-rays are emitted, doses of the X-rays radiated on the photocells $Pd_1$ to $Pd_{128}$ are sequentially and synchronously detected.

In the radiography mode, all the switches $Sc_1$ to $Sc_{128}$ are closed. In the same manner as in the fluoroscopy mode, charges are supplied from the power source 48 to the capacitors $Cd_1$ to $Cd_{128}$ and are also supplied to the capacitors $Ce_1$ to $Ce_{128}$, thereby charging the capacitors to the terminal voltage. The X-ray tube 4 exposes the patient 2 to X-ray pulses having a high tube current of several hundreds of mA. The X-rays transmitted through the patient 2 are converted into currents by the photocells $Pd_1$ to $Pd_{128}$ in the same manner as in the fluoroscopy mode. These currents erase the charges accumulated in the capacitors $Cd_1$ to $Cd_{128}$ and $Ce_1$ to $Ce_{128}$. Unlike in the fluoroscopy mode, the switches $Sa_1$ to $Sa_{128}$ are sequentially closed once with respect to one X-ray pulse. When the switches $Sa_1$ to $Sa_{128}$ are closed, the output corresponding to the X-ray intensity can be obtained from the output terminal OUT in the same manner as in the fluoroscopy mode.

The closed period of the switches $Sa_1$ to $Sa_{128}$ must be enough to charge the capacitors to an initial state. Therefore, in the fluoroscopy mode in which a capacitance of the capacitors is small and a large amount of charges cannot be accumulated, the closed period of the switches can be shorter than that in the imaging mode.

A modification of the light detector will be described with reference to a circuit diagram of FIG. 8. A difference between the light detector 70 of FIG. 7 and a light detector 72 of FIG. 8 is that diodes and Zener diodes are used in place of the switches $Sc_1$ to $Sc_{128}$ so as to automatically switch capacitances. Diodes 88 ($D_1$ to $D_{128}$) and Zener diodes 90 ($Z_1$ to $Z_{128}$) are connected in parallel with each other. Capacitors $Ce_1$ to $Ce_{128}$ are series-connected to the parallel circuits of the diodes 88 and the Zener diodes 90. These series circuits are parallel-connected to capacitors 76 ($Cd_1$ to $Cd_{128}$). The capacitors $Cd_1$ to $Cd_{128}$ are parallelconnected to photocells $Pd_1$ to $Pd_{128}$. The read operation in an accumulation mode of FIG. 8 is performed in the following manner. The switches $Sd_1$ to $Sd_{128}$ and $Sa_1$ to $Sa_{128}$ are temporarily closed so as to charge the capacitors $Cd_1$ to $Cd_{128}$. Thereafter, the switches are opened. In this case, assuming that a voltage of 20 V is generated from the power source 48, the terminal voltage of the capacitors $Cd_1$ to $Cd_{128}$ is 20 V and that of the capacitors $Ce_1$ to $Ce_{128}$ is 19.3 due to a voltage drop (0.7 V) of the diodes $D_1$ to $D_{128}$. Charges to be erased by the radiated X-rays are 20 V charged on the capacitors $Cd_1$ to $Cd_{128}$. Assuming that a Zener voltage of the Zener diodes $Z_1$ to $Z_{128}$ is 12 V, since the Zener diodes $Z_1$ to $Z_{128}$ are not enabled until the voltage of the capacitors $Cd_1$ to $Cd_{128}$ is decreased to 7.3 V, the voltage of the capacitors $Ce_1$ to $Ce_{128}$ is not decreased. However, when the voltage of the capacitors $Cd_1$ to $Cd_{128}$ is decreased to 7.3 V, the terminal voltage of the Zener diodes becomes higher than the Zener voltage and the Zener diodes are enabled. Thus, currents flow from the capacitors $Ce_1$ to $Ce_{128}$ to the capacitors $Cd_1$ to $Cd_{128}$, respectively, and the voltage of the capacitors $Ce_1$ to $Ce_{128}$ is decreased. In this manner, in this embodiment, when charges to be erased are increased, the capacitors $Ce_1$ to $Ce_{128}$ are automatically used. In other words, when the diodes $D_1$ to $D_{128}$ and the Zener diodes $Z_1$ to $Z_{128}$ are used, the capacitances can be automatically switched.

According to the second embodiment, when at least two capacitors (one is an electrode capacitor of the photocell itself) are parallelly-connected to the photocell so as to change an accumulation capacitance in correspondence to the X-ray dose, a radiation detector having a wide dynamic range corresponding to a wide dose range can be provided.

A third embodiment of the present invention will be described hereinafter. This embodiment also relates to an X-ray detection apparatus which can perform both the fluoroscopy and imaging modes in the same manner as in the second embodiment. In this embodiment, a variable gain light amplifier is used. In the fluoroscopy mode of a small dose, the gain is controlled to be high, and in the imaging mode of a large dose, the gain is controlled to be low so as to adjust the amount of light radiated on the light detector to the dynamic range thereof. FIG. 9 shows an embodiment wherein a parallel-plate I.I. 91 is used. A phosphor member 92 is provided in a vacuum chamber 94. A light detector 34, 70 or 72 shown in the first or second embodiment is disposed below the lower surface of the chamber 94.

An X-ray image transmitted through a patient passes through a glass surface of the chamber 94 and is radiated on a radiation surface of the member 92. The member 92 converts the radiated X-ray image into an optical image corresponding to its intensity. The optical image generated from an output surface of the member 92 is converted into an electronic image by a photoelectric surface 96 arranged to be in contact with the output surface of the member 92. A power source 98 applies a DC high voltage between the surface 96 and an output phosphor surface 100 so as to generate an electric field therebetween. The electronic image converted by the surface 96 is accelerated by the electric field and is bombarded on the surface 100. Thus, the amplified phosphor image is generated from the surface 100 by this bombardment. In the third embodiment, since no electron lens for converging the optical image need be used, an amplifier (i.e., the I.I. 91) can be thin. An intensity of the output phosphor image can be controlled by changing an application voltage from the power source 98.

A modification will be described with reference to a sectional view of FIG. 10 wherein an MCP (multi channel plate) 104 is used as the light amplifier.

An X-ray image transmitted through a patient is converted into light by the member 92. The light is converted into an electronic image by the surface 96 arranged in contact with the output surface of the member 92. The power source 98 applies a DC voltage between the surfaces 96 and 100. The electronic image is electron-multiplied by the MCP 104 arranged in contact with the output side of the surface 96 and is bombarded on the surface 100. Thereafter, the image is generated as the amplified phosphor image. An amplification factor of the MCP 104 can be controlled by changing the DC voltage applied from the power source 98.

In the above embodiments, since a variable gain light amplifier is provided before the light detector, even if the dynamic range of the light detector is limited to 80 dB, both the radiography mode with a large dose and the fluoroscopy mode with a small dose can be performed by a single apparatus. That is, in the radiography mode, the amplification factor is controlled to be low, and in the fluoroscopy mode, it is controlled to be high, so that the light detector can always be used within its dynamic range.

What is claimed is:

1. A radiographic image detection apparatus which detects a two-dimensional image of radiation transmitted through a patient, comprising:

radiation/light converting means for converting the raditation into light and for generating an optical image when a radiographic image is radiated thereon;

light detecting means, comprising a semiconductor, for converting light into an electrical signal in which the optical image having substantially the same magnification is radiated thereon, and the optical image is read as a two-dimensional image data signal;

capacitive means;

means for selectively connecting the capacitive means in parallel with the semiconductor so that the total capacitance in parallel with said semiconductor is varied responsive to the intensity of said radiation; and processing means for processing said image data signal generated from said light detecting means.

2. An apparatus according to claim 1, wherein said light detecting means has m×n pixels disposed on an insulating base in an m row×n column matrix form.

3. An apparatus according to claim 2, wherein each of said pixels comprises a photoelectric converting element for converting light into an electrical signal, and said light detecting means comprises readout means for sequentially reading out outputs from said photoelectric converting elements.

4. An apparatus according to claim 3, wherein said readout means comprises n column switches connected to said photoelectric converting elements, m row switches connected to said column switches in corresponding rows, a column shift register having n channels connected to said column switches in corresponding columns, and a row shift register having m channels connected to said row switches; and the outputs from said photoelectric converting elements are sequentially read out by scanning said column and row shift registers.

5. An apparatus according to claim 4, wherein said photoelectric converting elements are photocells, and said row and column switches are MOSFETs, said photocells and MOSFETs are stacked using thin film transistors.

6. An apparatus according to claim 5, wherein said photocell comprises a parallel circuit of a photocell portion for detecting light and an electrode capacitor.

7. An apparatus according to claim 6, wherein said light detecting means comprises a power source for applying a bias voltage to said photocell, a terminal voltage corresponding to the bias voltage is charged on said electrode capacitor, a part of said charge on said electrode capacitor is erased by carriers generated by light radiation to said photocell portion so as to store charge corresponding to a light amount in said electrode capacitor.

8. An apparatus according to claim 7, wherein said selectively connecting means connects the parallel circuit and said capacitive means in a radiography mode with a large radiation dose, and disconnects said capacitive means from the parallel circuit in a fluoroscopy mode with a small radiation dose.

9. An apparatus according to claim 8 wherein said selectively connecting means is a switch.

10. An apparatus according to claim 8, wherein said selectively connecting means comprises a parallel circuit of a diode and a Zener diode, and when a terminal voltage of said Zener diode is decreased below a Zener voltage, said capacitance means is connected to the parallel circuit of said photocell portion and said electrode capacitor.

11. An apparatus according to claim 1, further comprising a light amplifier, disposed between said radiation/light converting means and said light detecting means for amplifying a light amount of the optical image from said radiation/light converting means at substantially the same magnification.

12. An apparatus according to claim 11, wherein said light amplifier is a parallel-plate image intensifier.

13. An apparatus according to claim 11, wherein said light amplifier is a multi channel plate.

14. An apparatus according to claim 11, wherein said light amplifier increases the gain thereof when a dose is small, and decreases the gain thereof when a dose is large, so that the amount of light radiated on said light detecting means is adjusted within a proper range.

15. An apparatus according to claim 5, wherein said photocell is formed of a member selected from the group consisting of amorphous silicon and polycrystalline silicon.

16. An apparatus according to claim 1, further comprising a light guide member, disposed between said radiation/light converting means and said light detecting means, for guiding the optical image from said radiation/light converting means to said light detecting means.

17. An apparatus according to claim 16, wherein said light guide member is a plate-like fiber bundle manufactured in a manner such that a number of optical fibers are bundled and the bundle is sliced along a direction perpendicular to a longitudinal direction thereof.

18. An apparatus according to claim 16, wherein said light guide member is a rod lens array obtained by bundling lenses.

* * * * *

UNITED STATES PATENT AND TRADEMARK OFFICE
CERTIFICATE OF CORRECTION

PATENT NO. : 4,689,487
DATED : August 25, 1987
INVENTOR(S) : Masayuki Nishiki et al It is certified that error appears in the above-identified patent and that said Letters Patent is hereby corrected as shown below:

On the Title page, under Foreign Application Priority Data, change:

"Apr. 22, 1985 [JP]  Japan................ 50-84414"

to

--Apr. 22, 1985 [JP]  Japan................ 60-84414--

Signed and Sealed this

Nineteenth Day of January, 1988

Attest:

DONALD J. QUIGG

Attesting Officer   Commissioner of Patents and Trademarks